US009635119B2

(12) United States Patent
Izawa

(10) Patent No.: US 9,635,119 B2
(45) Date of Patent: Apr. 25, 2017

(54) COMMUNICATION FLOW CONTROL SYSTEM, COMMUNICATION FLOW CONTROL METHOD, AND COMMUNICATION FLOW PROCESSING PROGRAM

(75) Inventor: Tetsu Izawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/137,750

(22) Filed: Sep. 9, 2011

(65) Prior Publication Data
US 2012/0011264 A1 Jan. 12, 2012

Related U.S. Application Data

(63) Continuation of application No. PCT/JP2010/001603, filed on Mar. 8, 2010.

(30) Foreign Application Priority Data

Mar. 30, 2009 (JP) ................................. 2009-081938

(51) Int. Cl.
*G06F 15/16* (2006.01)
*H04L 29/08* (2006.01)
(Continued)

(52) U.S. Cl.
CPC ...... *H04L 67/2819* (2013.01); *H04L 47/2483* (2013.01); *H04L 69/22* (2013.01)

(58) Field of Classification Search
USPC ........................................................ 709/230
(Continued)

(56) References Cited

U.S. PATENT DOCUMENTS 6,839,346 B1 1/2005 Kametani
2003/0002438 A1 1/2003 Yazaki et al.
(Continued)

FOREIGN PATENT DOCUMENTS

CN 1726671 A 1/2006
EP 1 505 793 A1 2/2005
(Continued)

OTHER PUBLICATIONS

International Search Report (ISR) (PCT Form PCT/ISA/210) dated Mar. 30, 2010, with English translation.
(Continued)

*Primary Examiner* — Chris Parry
*Assistant Examiner* — Alan S Chou
(74) *Attorney, Agent, or Firm* — Finnegan, Henderson, Farabow, Garrett & Dunner LLP

(57) ABSTRACT

When a processing method determination means is not able to determine a processing method for a communication flow of packets, flow identification information transmission means transmits information within the packets equivalent to a portion or all of first flow identification information for identifying the communication flow to a processing determination unit. Control action determination means determines a control action on the basis of information received from a communication flow processing unit and second flow identification information stored in control action storage means. Control instruction means instructs the communication flow processing unit to control the communication flow on the basis of the control action. Processing method registration means registers a processing method for the communication flow with process method storage means on the basis of control instructions from a control unit.

17 Claims, 8 Drawing Sheets

(51) Int. Cl.
*H04L 12/851* (2013.01)
*H04L 29/06* (2006.01)
*H04L 12/26* (2006.01)

(58) Field of Classification Search
IPC ................ H04L 29/06,29/08072, 29/06095
See application file for complete search history.

(56) References Cited

U.S. PATENT DOCUMENTS

| | | | |
|---|---|---|---|
| 2003/0033467 A1 | 2/2003 | Yoshizawa et al. | |
| 2004/0184483 A1 | 9/2004 | Okamura et al. | |
| 2004/0202171 A1 | 10/2004 | Hama | |
| 2005/0276230 A1* | 12/2005 | Akahane et al. | 370/252 |
| 2007/0192543 A1* | 8/2007 | Naik et al. | 711/133 |
| 2008/0159293 A1 | 7/2008 | Tamai | |
| 2009/0144304 A1* | 6/2009 | Stephens et al. | 707/101 |

FOREIGN PATENT DOCUMENTS

| | | |
|---|---|---|
| JP | 2000-295274 A | 10/2000 |
| JP | 2003-018198 | 1/2003 |
| JP | 2003-60691 A | 2/2003 |
| JP | 2003-304278 | 10/2003 |
| JP | 2004-56340 A | 2/2004 |
| JP | 2004-080487 | 3/2004 |
| JP | 2004-515181 | 5/2004 |
| JP | 2004-236198 A | 8/2004 |
| JP | 2008-167340 A | 7/2008 |

OTHER PUBLICATIONS

Supplementary European Search Report, dated Aug. 27, 2012.
Japanese Office Action dated Nov. 5, 2013 with partial English translation thereof.
"The demonstration experience of OpenFlow on JGN2plus", Yoshihiko Kanaumi, et al., Proceedings of the IEICE (Institute of Electronics, Information and Communication Engineers) General Conference, Communication 2, BS-10-4, Mar. 4, 2009 (with partial translation thereof).
"A study on Policy-based MPLS Network Control", Yuji Nomura, et al., Proceedings of the IEICE (Institute of Electronics, Information and Communication Engineers) General Conference, Communication 2, BS-5-1, Mar. 7, 2000 (with partial translation thereof).
"A study on Policy-based Dynamic QoS Control", Yuji Nomura, et al., Technical Report (Shingaku Giho) of the IEICE (Institute of Electronics, Information and Communication Engineers), IN98-150 TM98-62 OFS98-67, Jan. 22, 1998 (with partial translation thereof).
Chinese Office Action with Search Report attached dated Nov. 4, 2013.
Japanese Office Action dated Dec. 2, 2014 with an English Translation thereof.
European Search Report, dated Jun. 6, 2014.
Communication Pursuant to Article 94(3) EPC in counterpart EP Application No. 14 156 878.2 dated Nov. 14, 2016.
Japanese Office Action issued by the Japanese Patent Office in counterpart Japanese Patent Application No. 2015-082987, dated Jan. 19, 2016.

* cited by examiner

FIG. 2

| RELAY UNIT IDENTIFIER (221) | EVENT TYPE (222) | FLOW IDENTIFICATION INFORMATION (223) | MIDDLE BOX ACTION (224) |
|---|---|---|---|
| 3 | PATH SETTING | DESTINATION X | SET ENTRY OUTPUT TO PORT 3002 SET FOR RELAY UNIT 3 |
| 3 | PATH SETTING | DESTINATION Y | SET ENTRY OUTPUT TO PORT 3003 SET FOR RELAY UNIT 3 |
| 3 | TIME-OUT | DESTINATION X | NOTIFY COMMUNICATION CONTROL UNIT |

FIG. 3

| FLOW IDENTIFICATION INFORMATION (321) | OUTPUT PORT (322) |
|---|---|
| SOURCE A DESTINATION Y | 3003 |
| SOURCE B DESTINATION Y | 3003 |
| SOURCE A DESTINATION X | 3002 |

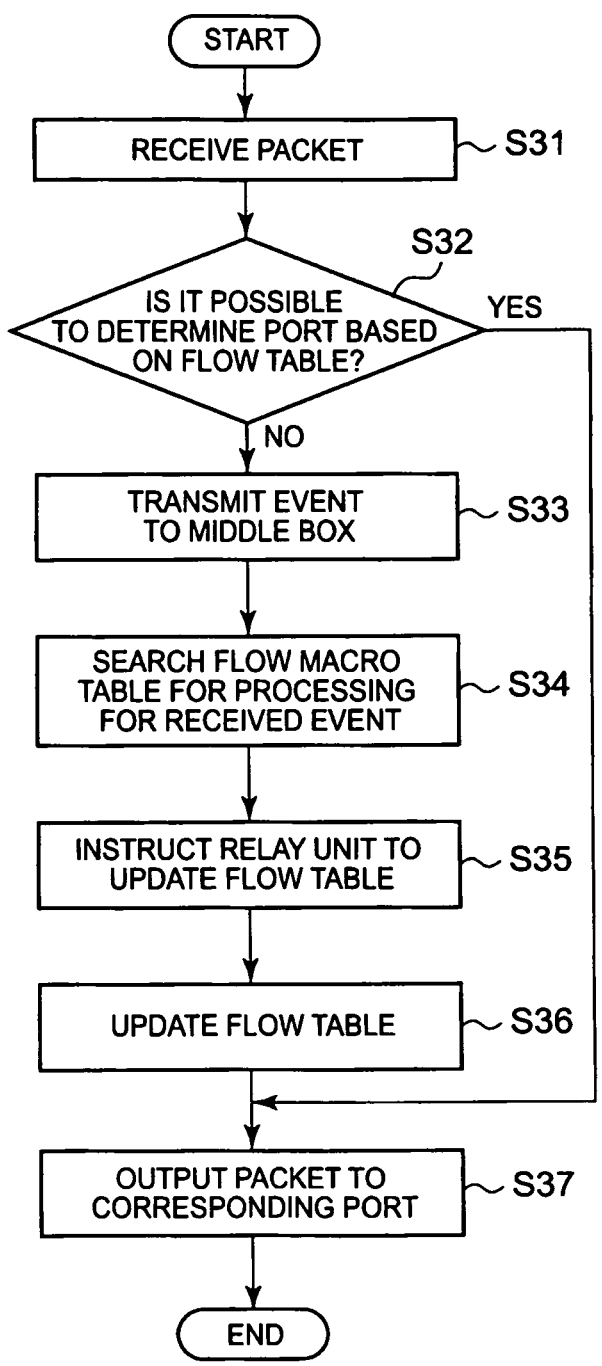

FIG. 5
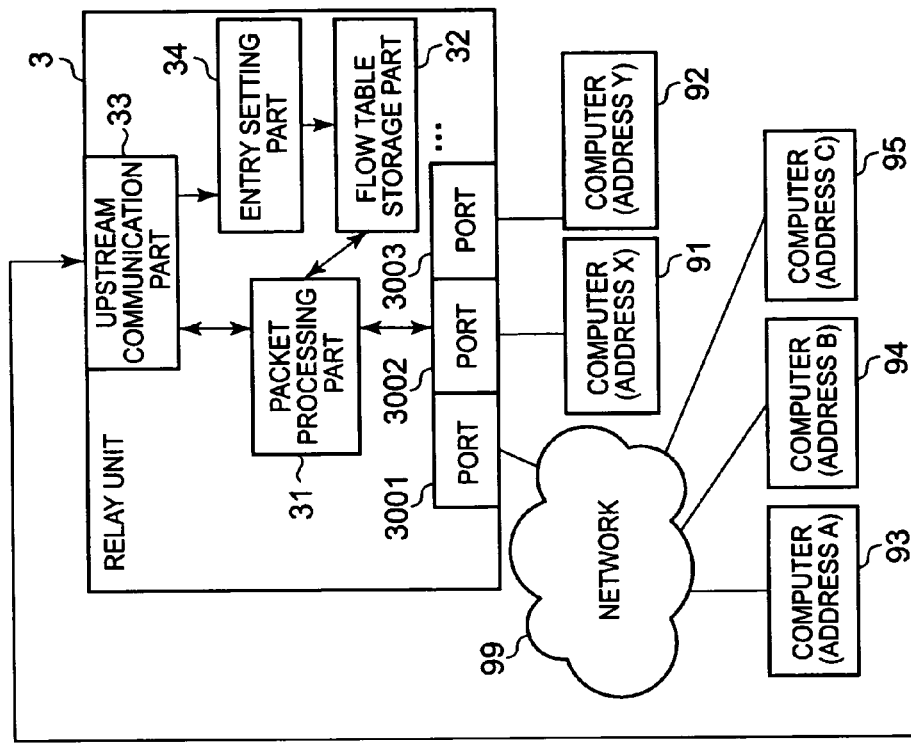
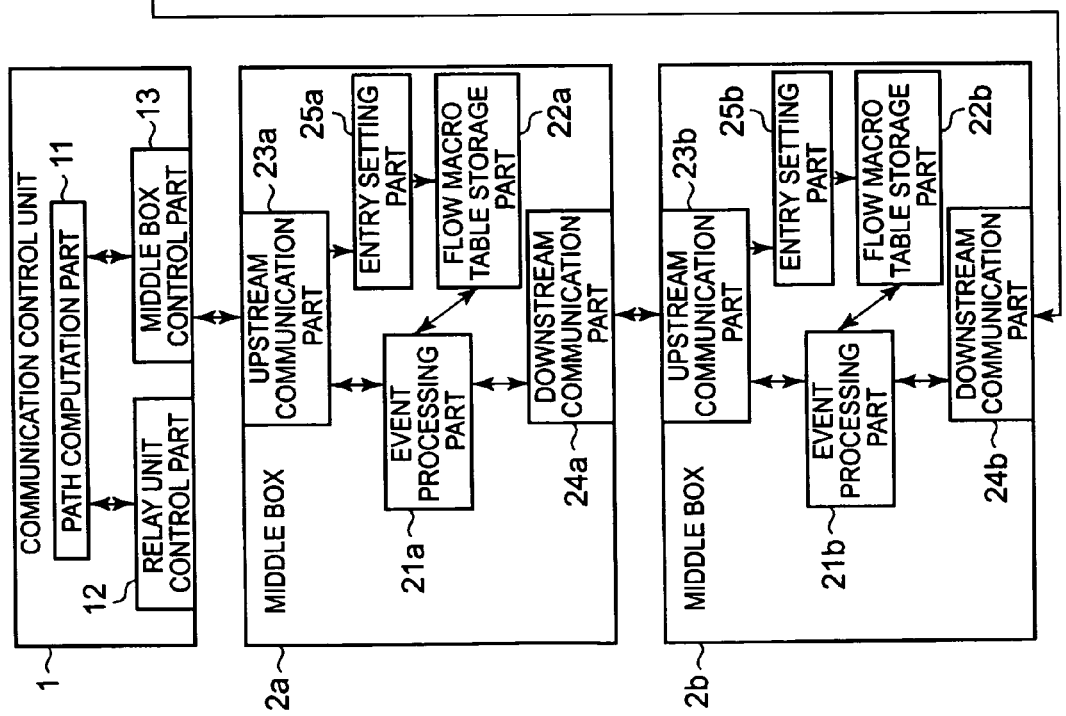

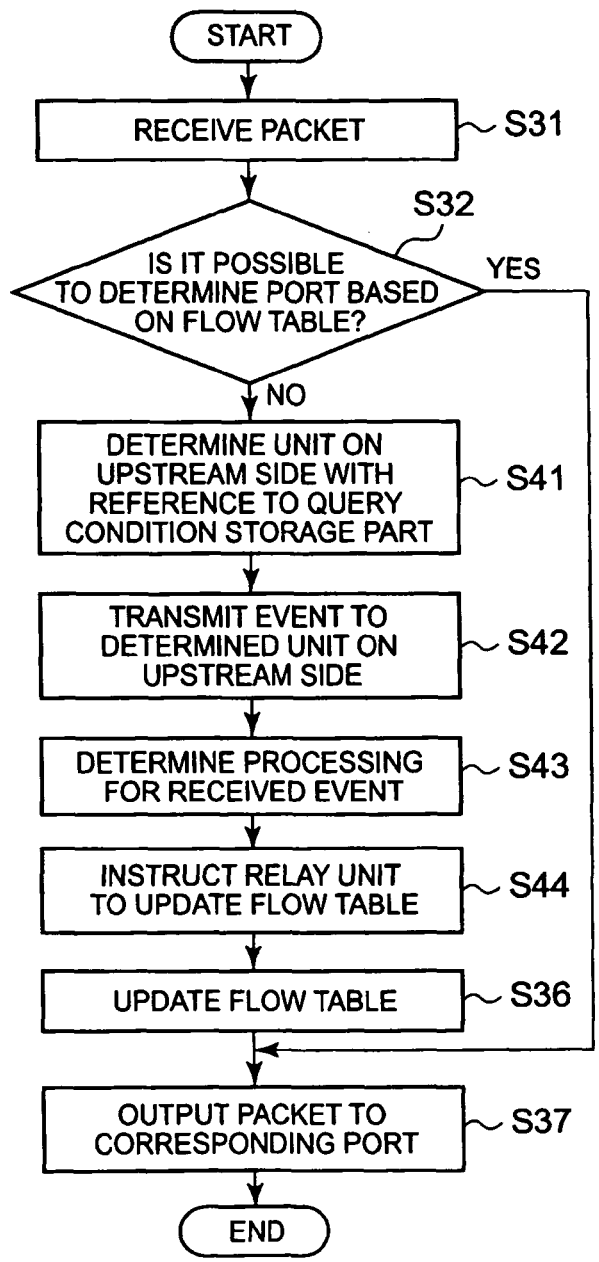

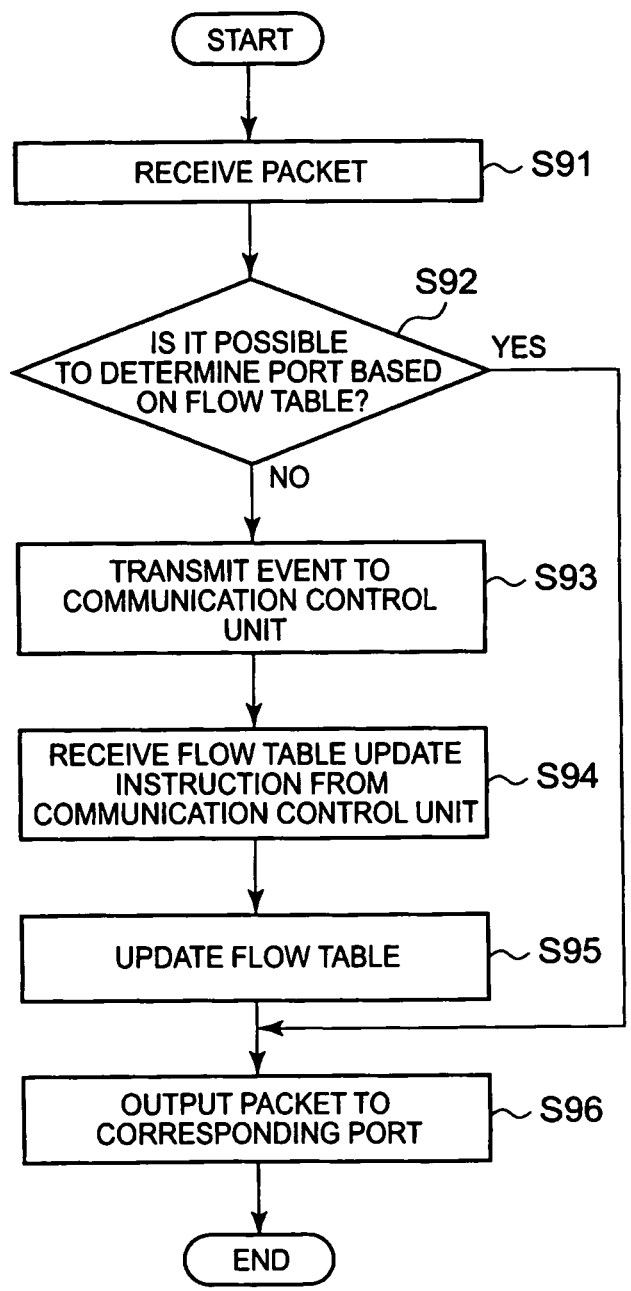

COMMUNICATION FLOW CONTROL SYSTEM, COMMUNICATION FLOW CONTROL METHOD, AND COMMUNICATION FLOW PROCESSING PROGRAM

TECHNICAL FIELD

The present invention relates to a communication flow control system, a communication flow processing unit applied to the communication flow control system, a processing determination unit, a communication flow control method, a communication flow processing method, a processing determination method, a communication flow processing program, and a processing determination program, which are capable of suppressing the load of a flow control performed by a communication control unit in a network system in which the communication control unit controls a communication flow.

BACKGROUND ART

In network systems, communication information is handled by a constant unit called a flow, and there are mechanisms that perform a quality control and the like in which a path control, filtering, and priority are used for each flow. The flow (also referred to as a packet flow) is one classification unit of packets, and is often classified on the basis of a TCP (Transmission Control Protocol) session or a transmitting/receiving node pair and the like.

For example, a case where the flows are discriminated therebetween on the basis of the IP (Internet Protocol) address and a TCP port of the transmitting/receiving node will be described by way of example. In this case, it may be said that all packets represented by "From [IP192.168.0.1: port 1000] to [IP192.168.0.2: port 80]" belong to the same flow. In addition, packets represented by "From [IP192.168.0.1: port1000] to [IP192.168.0.2: port 443]" is able to be determined as a separate flow. In such mechanisms, handling contents of the packets (for example, path setting, priority processing and the like) are determined by this flow unit.

In addition, in relay units that relay flows, the flows and processing information (for example, output ports or priorities and the like) corresponding thereto are stored in a table called a flow table. When packets are received, the relay unit searches the flow table on the basis of the contents of the received packets, and reads out corresponding processing information to determine processing such as transmission or discarding thereof.

For example, PTL 1 discloses a compression/expansion method of entries capable of registering more entries by performing pattern compression processing when the packet relay unit adds and registers flow table entries. In the compression/expansion method disclosed in PTL 1, when a new pattern to be newly registered is an incremental pattern which a difference is one bit with respect to a flow identification pattern of the entry, a mask pattern of the entry indicating the position of Don't Care bit for the flow identification pattern in flow identification is changed.

In addition, when a system is formed using the above-mentioned relay unit, there is a method in which the relay unit connected onto the network learns the paths autonomously by learning the MAC (Media Access Control) address for each port on the basis of a function included therein, or exchanging information with another relay unit. Meanwhile, when the relay unit exchanges information with another relay unit, there may also be a case where routing protocols for optimizing routing are used.

As a separate method, there is also a system in which the communication control unit controls the relay unit (or relay unit group) on the network. In such a system, when the relay unit from which packets are received is not able to determine the packet processing contents in the flow table search within the relay unit, the relay unit determines the packet processing contents by giving a query to the communication control unit.

FIG. 10 is a flow diagram illustrating general processing in a system in which a communication control unit controls a relay unit. When packets are received (step S91), the relay unit searches a flow table within the relay unit, and attempts to determine the output port of the packets (step S92). When the output port is able to be determined (YES in step S92), the relay unit outputs packets from the corresponding port and terminates a process (step S96). On the other hand, when the output port is not able to be determined (NO in step S92), the relay unit transmits an event to the communication control unit, and queries the unit about a method of resolving the packet processing (step S93). Here, the relay unit transmits a data string, including a portion or all of the packets received from the input port and information of the relay unit, to the communication control unit as an event. When receiving an event, the communication control unit resolves an output destination port through which the relay unit outputs the packets on the basis of the content thereof, and instructs the relay unit to update the flow table. When receiving update instructions from the communication control unit (step S94), the relay unit updates the flow table (step S95), and outputs the packets on the basis of the contents thereof (step S96).

Meanwhile, the event is a data string including at least a portion or all of the packets received from an input/output port and information of the relay unit. The communication control unit resolves the output destination port with reference to the event contents transmitted by the relay unit, and updates the flow table within the relay unit so as to transmit the received packets. Thereby, the packets are normally transmitted.

In addition, PTL 2 discloses a transmission band control unit in which a network control unit controls transmission bands of the entire network, and a flow transfer request from a user terminal is received, to create related router setting information and set the information for each router. In the transmission band control unit disclosed in PTL 2, when the network control unit receives the flow transfer request from the user terminal, a path that meets the request received by the network control unit is searched for to create path information. In addition, the network control unit creates router setting information in order to distribute the load in the direction in which the load of the network becomes uniform. The network control unit sets the path information and router setting information for each router.

In addition, PTL 3 discloses a network router in which a network management server controls an open programmable router and sets a flow control table. When receiving packets having reached a network, the network router disclosed in PTL 3 performs appropriate operations on packets including removal of header information, replacement of header information by new address information, and other well-known operations, using packet header information. At this time, a router controller controls a portion of the packets on the basis of setting of the flow control table. Meanwhile, the flow control table is maintained by the router controller, and the router controller itself receives information from a controller.

On the other hand, as described above, the relay unit stores the flow and processing information corresponding thereto within the flow table, and searches the flow table on the basis of the received packets, to determine processing such as transmission or discarding thereof. For this reason, it is necessary to set processing at a fine unit (fine granularity) for each control flow in order to control the flow at a fine level.

PTL 4 discloses an IP flow multistage hash method in which flows having different granularities are mixed using a two-stage table for search of a transfer unit. In the method disclosed in PTL 4, an IP packet destination IP address is hashed in a first table, and a destination IP address and an IP packet source IP address of are hashed as a set in a second table. Transfer means searches for the entry linked to a hash value destination of the first table on the basis of the destination IP address when a link to the first table is detected, and searches for the entry linked to a hash value destination of the second table by hashing a set of the destination IP address and the source IP address when a link to the second table is detected. When matching entries are detected, the transfer means performs a relay of the IP packets in accordance with the information thereof.

CITATION LIST

Patent Literature

PTL 1: Japanese Patent Application Laid-Open No. 2008-167340 (Paragraphs 0018 to 0028, FIG. 1)
PTL 2: Japanese Patent Application Laid-Open No. 2004-236198 (Paragraphs 0095 to 0097, FIGS. 5 and 6)
PTL 3: Japanese Patent Application Laid-Open No. 2003-60691 (Paragraphs 0021 to 0024, FIG. 2)
PTL 4: Japanese Patent Application Laid-Open No. 2004-56340 (Paragraph 0022)

SUMMARY OF INVENTION

Technical Problem

In the system in which the communication control unit controls the relay unit, when the packet processing contents is not able to be determined in flow table search within the relay unit, the relay unit from which packets are received queries the communication control unit that controls the relay unit about the packet processing contents. The communication control unit determines the processing contents in accordance with the packet contents. For example, when the relay unit is not able to determine the packet output destination, the communication control unit computes the packet delivery path. However, the communication control unit generally controls a plurality of relay units, and thus when queries about the packet processing contents from a plurality of relay units are concentrated, the load of the communication control unit becomes high.

In order to reduce the amount of the queries to the communication control unit, it is considered that fine-grained processing information is previously set for the flow table so that the flow is able to be processed within the relay unit at a fine-grained level. However, there may be a problem that when processing information for the fine-grained flow is excessively set, resource consumption is increased due to an increase in the amount of data set for the flow table.

Consequently, it is an object of the invention to provide a communication flow control system, a communication flow processing unit applied to the communication flow control system, a processing determination unit, a communication flow control method, a communication flow processing method, a processing determination method, a communication flow processing program, and a processing determination program, which are capable of performing a fine-grained flow control while suppressing the load of a communication control unit in a network system of a type in which the communication control unit controls a relay unit or a relay unit group.

Solution to Problem

Provided is a communication flow control system according to the invention comprising: a communication flow processing unit that processes a communication flow on the basis of a processing method determined by a communication control unit which is a unit that determines the processing method for the communication flow; and a processing determination unit, connected between the communication control unit and the communication flow processing unit, that determines processing for the communication flow in response to a request from the communication flow processing unit, wherein the communication flow processing unit includes processing method storage means that stores first flow identification information which is information for identifying the communication flow and the processing method in association with each other, processing method determination means that determines the processing method on the basis of the first flow identification information stored in the processing method storage means, when packets are received, flow identification information transmission means that transmits information within the packets equivalent to a portion or all of the first flow identification information for identifying the communication flow to the processing determination unit, when the processing method determination means is not able to determine the processing method for the communication flow of the packets, and processing method registration means that registers the processing method for the communication flow with the processing method storage means on the basis of control instructions, when the control instructions for the communication flow are detected from the processing determination unit, and wherein the processing determination unit includes control action storage means that stores second flow identification information which is a portion or all of the first flow identification information and a control action which is an action performed by the processing determination unit in association with each other, control action determination means that determines the control action, at the time of receiving information within the packets equivalent to a portion or all of the first flow identification information from the communication flow processing unit, on the basis of the received information and the second flow identification information stored in the control action storage means, and control instruction means that instructs the communication flow processing unit to control the communication flow on the basis of the control action determined by the control action determination means.

Provided is a communication flow processing unit according to the invention, connected to a processing determination unit, that determines a processing method for a communication flow from information within packets equivalent to a portion or all of flow identification information which is information for identifying the communication flow, in response to the request from another unit, and instructs the unit to perform a control, comprising: processing method storage means that stores the flow identification information and the processing method in association with each other; processing method determination means that determines the processing method on the basis of the flow identification information stored in the processing method storage means, when packets are received; flow identification information transmission means that transmits information within the packets equivalent to a portion or all of the flow identification information for identifying the communication flow to the processing determination unit, when the processing method determination means is not able to determine the processing method for the communication flow of the packets; and processing method registration means that registers the processing method for the communication flow with the processing method storage means on the basis of control instructions, when the control instructions for the communication flow are detected from the processing determination unit.

Provided is a processing determination unit according to the invention, that stores first flow identification information which is information for identifying a communication flow and a processing method for the communication flow in association with each other, is connected to a communication flow processing unit that determines the processing method for the communication flow on the basis of the stored first flow identification information, when packets are received, and determines processing for the communication flow in response to a request from the communication flow processing unit, comprising: control action storage means that stores second flow identification information which is a portion or all of the first flow identification information and a control action which is an action performed by the processing determination unit in association with each other; control action determination means that determines the control action, at the time of receiving information within the packets equivalent to a portion or all of the first flow identification information from the communication flow processing unit, on the basis of the received information and the second flow identification information stored in the control action storage means; and control instruction means that instructs the communication flow processing unit to control the communication flow on the basis of the control action determined by the control action determination means.

Provided is a method of controlling a communication flow according to the invention, comprising the steps of: causing a communication flow processing unit that processes a communication flow on the basis of a processing method determined by a communication control unit, which is a unit that determines the processing method for the communication flow, to determine the processing method on the basis of flow identification information stored in processing method storage means that stores first flow identification information which is information for identifying the communication flow and the processing method in association with each other, when packets are received; causing the communication flow processing unit to transmit information within the packets equivalent to a portion or all of the first flow identification information for identifying the communication flow to a processing determination unit that determines processing for the communication flow in response to a request from the communication flow processing unit, when the processing method for the communication flow of the packets is not able to be determined; causing the processing determination unit to determine a control action, at the time of receiving information within the packets equivalent to a portion or all of the first flow identification information from the communication flow processing unit, on the basis of second flow identification information stored in control action storage means that stores the received information, the second flow identification information which is a portion or all of the first flow identification information and the control action which is an action performed by the processing determination unit in association with each other; causing the processing determination unit to instruct the communication flow processing unit to control the communication flow on the basis of the control action; and causing the communication flow processing unit to register the processing method for the communication flow with the processing method storage means on the basis of the control instructions, when the control instructions for the communication flow are detected from the processing determination unit.

Provided is a method of processing a communication flow according to the invention, comprising the steps of: determining a processing method on the basis of flow identification information stored in processing method storage means that stores the flow identification information which is information for identifying a communication flow and the processing method of the communication flow in association with each other, when packets are received; transmitting information within the packets equivalent to a portion or all of the flow identification information for identifying the communication flow to a processing determination unit that determines the processing method for the communication flow from information within the packets equivalent to a portion or all of the flow identification information in response to a request from another unit and instructs the unit to perform a control, when the processing method for the communication flow of the packets is not able to be determined; and registering the processing method for the communication flow with the processing method storage means on the basis of control instructions, when the control instructions for the communication flow are detected from the processing determination unit.

Provided is a processing determination method according to the invention, comprising the steps of: determining a control action, at the time of receiving information within packets equivalent to a portion or all of first flow identification information from a communication flow processing unit which is a unit that stores the first flow identification information which is information for identifying a communication flow and a processing method for the communication flow in association with each other, the unit determining the processing method for the communication flow on the basis of the stored first flow identification information when the packets are received, on the basis of the received information and second flow identification information stored in control action storage means that stores the control action which is an action performed by a processing determination unit that determines processing for the communication flow in response to a request from the communication flow processing unit and the second flow identification information which is a portion or all of the first flow identification information in association with each other, and instructing the communication flow processing unit to control the communication flow on the basis of the control action.

Provided is a communication flow processing program according to the invention, which is applied to a computer including processing method storage means that stores flow identification information which is information for identifying a communication flow and a processing method for the communication flow in association with each other, the program causing the computer to execute: processing method determination processing of determining the processing method on the basis of the flow identification information stored in the processing method storage means, when packets are received; flow identification information transmission processing of transmitting information within the packets equivalent to a portion or all of the flow identification information for identifying the communication flow to a processing determination unit that determines the processing method for the communication flow from information within the packets equivalent to a portion or all of the flow identification information in response to a request from another unit and instructs the unit to perform a control, when the processing method for the communication flow of the packets is not able to be determined; and processing method registration processing of registering the processing method for the communication flow with the processing method storage means on the basis of control instructions, when the control instructions for the communication flow are detected from the processing determination unit.

Provided is a processing determination program according to the invention, which is applied to a computer that stores first flow identification information which is information for identifying a communication flow and a processing method for the communication flow in association with each other, is connected to a communication flow processing unit that determines the processing method for the communication flow on the basis of the stored first flow identification information, when packets are received, and determines processing for the communication flow in response to a request from the communication flow processing unit, the computer including control action storage means that stores second flow identification information which is a portion or all of the first flow identification information and a control action which is an action performed by the computer in association with each other, the program causing the computer to execute: control action determination processing of determining the control action, at the time of receiving information within the packets equivalent to a portion or all of the first flow identification information from the communication flow processing unit, on the basis of the received information and the second flow identification information stored in the control action storage means; and, control instruction processing of instructing the communication flow processing unit to control the communication flow on the basis of the control action.

Advantageous Effects of Invention

According to the invention, it is possible to perform a fine-grained flow control while suppressing the load of a communication control unit in a network system of a type in which the communication control unit controls a relay unit or a relay unit group.

BRIEF DESCRIPTION OF DRAWINGS

FIG. 2 is an explanatory diagram illustrating an example of a flow macro table.

FIG. 3 is an explanatory diagram illustrating an example of a flow table.

FIG. 4 is a flow diagram illustrating an example of processing in which a relay unit queries a middle box about a packet output destination.

FIG. 5 is a block diagram illustrating an example of the communication flow control system according to a modified example of the first exemplary embodiment.

FIG. 7 is an explanatory diagram illustrating an example of contents of a query destination condition storage part.

FIG. 8 is a flow diagram illustrating an example of processing in which the relay unit queries a communication control unit or the middle box about a packet output destination.

FIG. 10 is a flow diagram illustrating processing in a system in which the communication control unit controls the relay unit.

DESCRIPTION OF EMBODIMENT

Hereinafter, exemplary embodiments will be described with reference to the drawings of the invention.

Exemplary Embodiment 1

Figure 1:
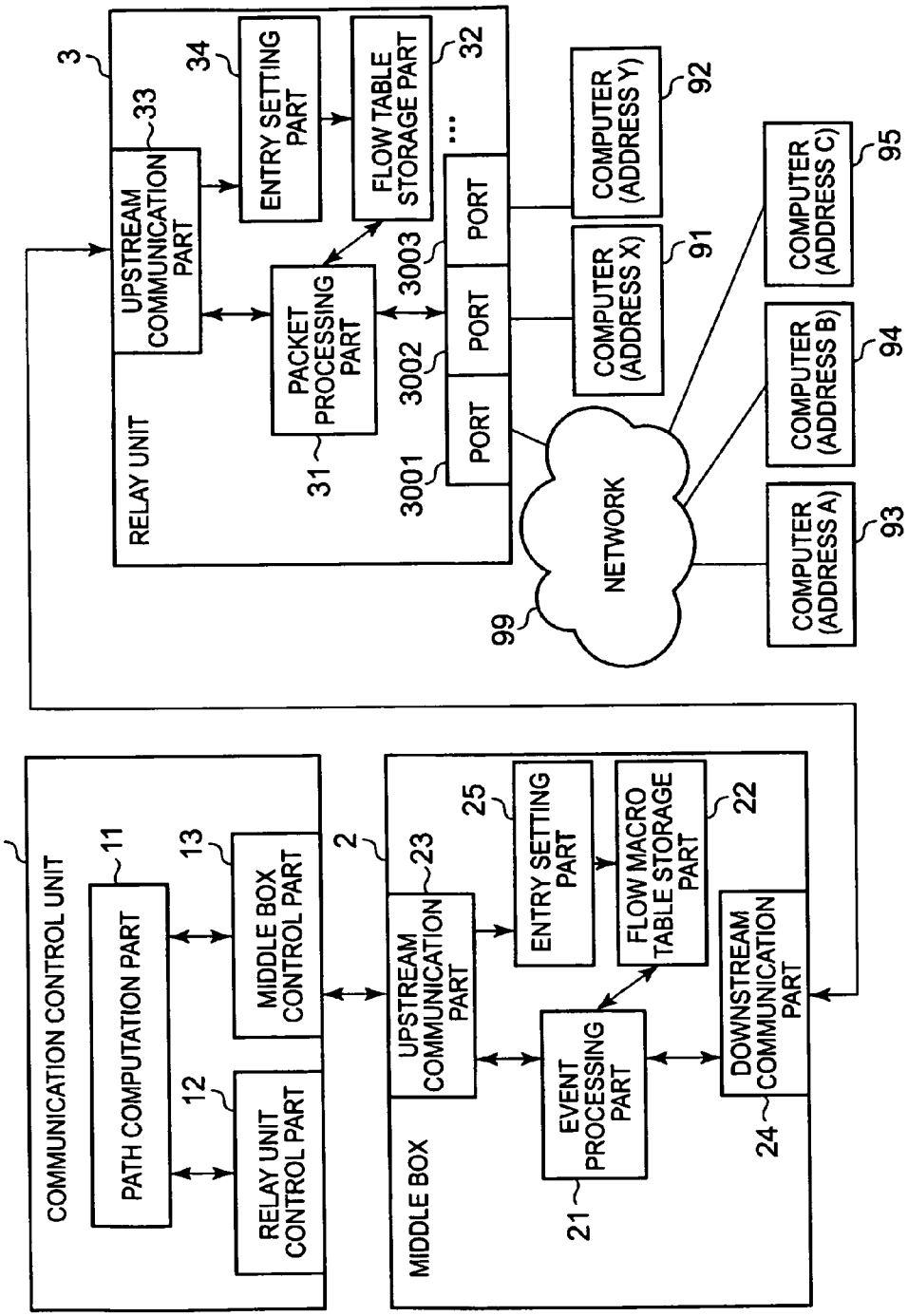
FIG. 1 is a block diagram illustrating an example of a communication flow control system according to a first exemplary embodiment.

FIG. 1 is a block diagram illustrating an example of a communication flow control system according to a first exemplary embodiment of the invention. The communication flow control system according to the first exemplary embodiment includes a communication control unit 1, a middle box 2, and a relay unit 3. The communication control unit 1, the middle box 2, and the relay unit 3 are connected through, for example, a communication network such as a public network, but the form of the communication network is not limited to the public network.

The communication control unit 1 includes a path computation part 11, a relay unit control part 12, and a middle box control part 13. When the relay unit 3 is connected to the communication control unit 1, the relay unit control part 12 is an interface for issuing control instructions to the relay unit 3 or receiving an event from the relay unit 3. Here, it may be said that the event is a data string including a portion or all of the packets received from an input/output port and information of the relay unit, and is information capable of identifying flow contents. The number of relay units 3 connected to the relay unit control part 12 may be one, or may be two or more. Alternatively, when the middle box 2 is connected to the middle box control part 13 described later, the relay unit 3 may not be connected to the relay unit control part 12.

When the middle box 2 is connected to the communication control unit 1, the middle box control part 13 is an interface for issuing control instructions to the middle box 2 or receiving an event from the middle box 2. The number of middle boxes 2 connected to the middle box control part 13 may be one, or may be two or more.

The path computation part 11 determines a packet processing method in response to a request from the relay unit 3 connected to the relay unit control part 12 or the middle box 2 connected to the middle box control part 13. For example, when a request for determination of a packet output destination is received, the path computation part 11 computes a delivery path. In addition, the path computation part 11 instructs the relay unit 3 and the middle box 2 to update the contents of a flow macro table storage part 22 or a flow table storage part 32 described later on the basis of the computation result and the like. The path computation part 11 computes a packet delivery path in response to the request from the relay unit 3 or the middle box 2, for example, on the basis of an end node within the network or placement information of the relay unit 3 previously stored in a storage part (not shown) of the communication control unit 1. In this way, the communication control unit 1 determines a processing method for the communication flow in response to the request. Meanwhile, a method of computing the delivery path is not limited to the above-mentioned method.

The path computation part 11 is implemented, for example, by a CPU of a computer operating in accordance with a program (path computation program). For example, the program is stored in the storage part (not shown) included in the communication control unit 1, and the CPU may read the program, and may operate as the path computation part 11 in accordance with the program.

The middle box 2 includes an event processing part 21, a flow macro table storage part 22, an upstream communication part 23, a downstream communication part 24, and an entry setting part 25. The downstream communication part 24 is an interface for issuing control instructions to a unit on the downstream side or receiving an event from the unit on the downstream side. Meanwhile, the unit on the downstream side means a unit that queries the middle box 2 about the packet delivery path or processing method and the like. On the contrary, a unit that receives a query about the processing method and the like from the middle box 2 is referred to as a unit on the upstream side. The number of relay units 3 connected to the downstream communication part 24 may be one, or may be two or more. In the exemplary embodiment, a description will be made of a case where the unit on the downstream side is the relay unit 3. That is, a description will be made of a case where the downstream communication part 24 issues control instructions to the relay unit 3, or receives an event from the relay unit 3.

The upstream communication part 23 is an interface for transmitting an event to the unit on the upstream side or receiving control instructions from the unit on the upstream side. In the exemplary embodiment, a description will be made of a case where the unit on the upstream side is the communication control unit 1. That is, a description will be made of a case where the upstream communication part 23 transmits an event to the communication control unit 1, or receives control instructions from the communication control unit 1.

The flow macro table storage part 22 is a storage unit that stores a table (hereinafter, referred to as a flow macro table) in which an action performed by the middle box 2 is associated with an event transmitted from the unit on the downstream side. For example, the flow macro table storage part 22 stores a flow macro table in which an event transmitted from the relay unit 3 and an action performed by the middle box 2 with respect to the event are associated with each other. Entries of the flow macro table are registered by the later-described entry setting part 25 in accordance with the instructions from the communication control unit 1. That is, it may be said that the flow macro table is a table managed by the communication control unit 1. The entries of the flow macro table are Don't Care with respect to other information (for example, source addresses or protocol types and the like) which is not expressly described. That is, the flow macro table storage part 22 stores a flow macro table having coarse-grained entries which match a plurality of fine-grained flows.

FIG. 2 is an explanatory diagram illustrating an example of a flow macro table. In the example shown in FIG. 2, the flow macro table includes contents representing a relay unit identifier 221, an event type 222, flow identification information 223, and a middle box action 224. The relay unit identifier 221 is an identifier for identifying the relay unit 3. The event type 222 is an identifier for identifying events such as a path setting request, notification of flow time-out, and notification of abnormal units. The flow identification information 223 is information for discriminating between the flows. The example shown in FIG. 2 shows discrimination between the flows based on destination addresses. Meanwhile, information represented by the flow identification information 223 is not limited to the destination address. Information represented by the flow identification information 223 may use more parameters such as a protocol number or high-level protocol information in addition to the destination address. For example, when an event received from the relay unit 3 is a path setting request for "destination address Y", the second line of the example shown in FIG. 2 represents "instructing the relay unit 3 to set entries for outputting packets from port 3003" with respect to the event.

The middle box action 224 represents an action performed by the middle box 2 with respect to an event capable of being identified by the relay unit identifier 221, the event type 222 and the flow identification information 223. In the example shown in FIG. 2, although one action performed by the middle box 2 is shown, the middle box action 224 is not limited to one action, but may include a plurality of actions.

The event processing part 21 determines an action corresponding to an event received from the unit on the downstream side. First, the event processing part 21 searches the flow macro table for processing corresponding to the event received from the unit on the downstream side. That is, the event processing part 21 searches the flow macro table for processing corresponding to an event received from the relay unit 3. As mentioned above, the entries of the flow macro table are Don't Care with respect to other information which is not described expressly, and are coarse-grained entries that match a plurality of fine-grained flows. Therefore, even when information other than the contents which are set in the flow identification information 223 is included in the received event, the event processing part 21 does not use the information as the search conditions. For example, in the example shown in FIG. 2, the contents of "destination information" are set in the flow identification information 223. Therefore, even when the source address or the protocol type is included in the received event, the event processing part 21 does not use the information as the search conditions. The event processing part 21 instructs the unit on the downstream side to control the flow represented by the event, on the basis of the extracted action (in the example shown in FIG. 2, contents represented by the middle box action 224). For example, the event processing part 21 performs an update instruction for the flow table storage part 32 within the later-described relay unit 3 through the downstream communication part 24. At this time, the event processing part 21 creates fine-grained entries using the contents of the flow macro table and the event information, and updates the contents of the flow table storage part 32. For example, when information is extracted from the flow macro table, the event processing part 21 may extract requirements which are not included in the extracted information, or requirements (for example, source address) present in the later-described flow table from the received event, and may update the later-described flow table on the basis of these information. In this way, the middle box 2 controls the relay unit 3.

In addition, when processing corresponding to the event received from the relay unit 3 is not present in the flow macro table, the event processing part 21 transfers an event to the communication control unit 1 through the upstream communication part 23. Meanwhile, it may be said that the case where the processing corresponding to the event received from the relay unit 3 is not present in the flow macro table refers to a case where the middle box 2 is not able to determine processing of packets received from the relay unit 3.

In the case of the example shown in FIG. 2, the event processing part 21 makes a search using the relay unit identifier 221, the event type 222, and the flow identification information 223 as a key, and extracts the middle box action 224 matching the search conditions. When no matching entry is present, the event processing part 21 transmits an event to the unit on the upstream side (that is, communication control unit 1), and queries the unit about processing contents.

The entry setting part 25 updates the entries of the flow macro table in response to the instructions from the unit on the upstream side. For example, when the event processing part 21 transfers an event to the communication control unit 1 through the upstream communication part 23 and receives a delivery path computed by the communication control unit 1, the entry setting part 25 registers the delivery path as an entry of the flow macro table.

In addition, the event processing part 21 may notify the communication control unit 1 of the contents of processing performed on the unit on the downstream side. In the network system in which the communication control unit 1 controls the relay unit 3, the communication control unit 1 is able to ascertain processing for the flow on the network by notifying the communication control unit 1 of these processing contents.

The event processing part 21 and the entry setting part 25 are implemented by, for example, a CPU of a computer operating in accordance with a program (unit control program). For example, the program is stored in a storage part (not shown) included in the middle box 2, and the CPU may read the program, and may operate as the event processing part 21 and the entry setting part 25 in accordance with the program.

The relay unit 3 includes a packet processing part 31, the flow table storage part 32, an upstream communication part 33, an entry setting part 34, and input/output ports 3001 to 3003. The relay unit 3 is connected directly to other computers 91 to 95 through the input/output ports 3001 to 3003, or through a network 99 such as a public transmission network. Meanwhile, in the above-mentioned description, although a description is made of the case where three input/output ports are included therein, the number of input/output ports is not limited to three. In the following description, the relay unit 3 is connected to the computer 93 having address A, the computer 94 having address B and the computer 95 having address C, through the port 3001 and the network 99. In addition, the relay unit 3 is connected to the computer 91 having address X through the port 3002, and is connected to the computer 92 having address Y through the port 3003.

The upstream communication part 33 is an interface for transmitting an event to the middle box 2 or the communication control unit 1 or receiving control instructions from the middle box 2 or the communication control unit 1.

The flow table storage part 32 is a storage unit that stores a table (hereinafter, referred to as a flow table) in which information for identifying a flow and a processing method for the flow are associated with each other. For example, the flow table storage part 32 stores a flow table in which the port through which the relay unit 3 outputs the packets is associated with the flow contents. The entries of the flow table are registered by the entry setting part 34 described later in accordance with the instructions from the communication control unit 1 or the middle box 2. That is, it may be said that the flow table is a table managed by the communication control unit 1 or the middle box 2. In addition, the flow table storage part 32 stores a flow table having more finely-grained entries than the flow macro table.

FIG. 3 is an explanatory diagram illustrating an example of a flow table. In the example shown in FIG. 3, the flow table includes contents representing flow identification information 321 and an output port 322. The flow identification information 321 is information for discriminating between the flows. The example shown in FIG. 3 shows discrimination between the flows based on source addresses and destination addresses. Meanwhile, information represented by the flow identification information 321 is not limited to the source address and the destination address. Information represented by the flow identification information 321 may use more parameters such as a protocol number or high-level protocol information in addition to the source address or the destination address. The output port 322 indicates a port for outputting packets of the flow capable of being discriminated by the flow identifier 321. As described above, in the example, the flow macro table has the destination address as information for discriminating between the flows. On the other hand, the flow table has the source address and the destination address. That is, the flow table has more finely-grained entries than the flow macro table.

When a flow is received, the packet processing part 31 determines a processing method for the flow on the basis of information which is set in the flow table. First, the packet processing part 31 searches for whether the output port corresponding to the flow contents is present in the flow table with reference to the packets received from the input/output port. When the output port corresponding to the flow contents is present in the flow table, the packet processing part 31 transfers packets to the output port. When the output port corresponding to the flow contents is not present in the flow table, the packet processing part 31 transfers an event to the communication control unit 1 or the middle box 2 through the upstream communication part 33. Particularly, the packet processing part 31 transmits information equivalent to a portion or all of identification information for identifying the flow to the middle box 2. In the example, the identification information for identifying the flow corresponds to "the source address and the destination address", and a portion or all of the identification information transmitted to the middle box 2 corresponds to the "destination address".

The entry setting part 34 updates the entries of the flow table in accordance with the control instructions from the unit on the upstream side. For example, when the delivery path computed by the communication control unit 1 or the delivery path determined by the middle box 2 is received, the entry setting part 34 registers the delivery path as the entries of the flow table.

The packet processing part 31 and the entry setting part 34 are implemented by, for example, a CPU of a computer operating in accordance with a program (communication flow processing program). For example, the program is stored in a storage part (not shown) included in the relay unit 3, and the CPU may read the program, and may operate as the packet processing part 31 and the entry setting part 34 in accordance with the program.

Meanwhile, in the exemplary embodiment, the communication control unit 1 is connected directly to the middle box 2, and the middle box 2 is connected directly to the relay unit 3.

Next, a description of an action will be made. In the following description, the flow macro table and the entries of the flow table in the initial state are in a state shown in the examples of FIG. 2 and FIG. 3. In addition, processing information of an event transmitted from the relay unit 3 is stored in the flow macro table.

FIG. 4 is a flow diagram illustrating an example of processing in which the relay unit 3 queries the middle box 2 about a packet output destination. When the relay unit 3 receives packets, the packet processing part 31 searches for whether the output port corresponding to the flow contents is present in the flow table with reference to the packets (step S31). When the output port corresponding to the flow contents is present in the flow table (YES in step S32), the packet processing part 31 outputs packets from the output port (step S37). That is, the output port is resolved within the relay unit 3 with respect to packets for which there are entries in the flow table, and the packets are sent out to other computers. For example, the fact that the output destination of the packets transmitted from the computer 93 having address A to the computer 92 having address Y is the port 3003 is obvious from the flow table shown in FIG. 3, and the packets are sent out from the port 3003.

On the other hand, when the output port corresponding to the flow contents is not present in the flow table (NO in step S32), the packet processing part 31 transfers an event to the middle box 2 through the upstream communication part 33 (step S33). That is, since the packet processing part 31 is not able to determine the output port of the packets, belonging to the flow for which entries are not present in the flow table, within the relay unit 3, the packet processing part sends out a path determination request event to the middle box 2 in order to determine the output port. For example, the packet processing part 31 is not able to resolve the destination of the packets transmitted from the computer 93 having address C to the computer 92 having address Y in the flow table shown in FIG. 3. For this reason, the packet processing part 31 sends out the path determination request event including packet information from the upstream communication part 33.

When the downstream communication part 24 of the middle box 2 receives an event from the relay unit 3, the event processing part 21 searches the flow macro table for processing corresponding to the event received from the relay unit 3 (step S34). For example, the event processing part 21 extracts entries indicating that "the packets of source address C and destination address Y are output from the port 3003" from the packet information included in the event and the corresponding entries of the flow macro table. The event processing part 21 transmits control information for instructing update of the flow table to the relay unit 3 (step S35). When the upstream communication part 33 of the relay unit 3 receives the control information, the entry setting part 34 updates the entries of the flow table (step S36). Thereafter, the packet processing part 31 outputs packets from the output port indicating the updated entries (step S37).

Meanwhile, since the flow control is performed by the communication control unit 1, the event processing part 21 may transmit control information to the relay unit 3, and at the same time or after that, may notify (inform) the communication control unit 1 of information about the control information. In addition, the event processing part 21 may perform this notification (information) action for the purpose of path resolution, and may perform zero or more path resolution actions all at once for the purpose of load reduction. Meanwhile, the fact that the event processing part 21 performs zero or more path resolution actions all at once means that the event processing part 21 may perform the notification (information) action at predefined time intervals. In addition, it may also be said that the event processing part 21 performs the notification (information) action using the elapse of a certain period of time as a trigger. That is, the event processing part 21 may perform the notification (information) action at regular time intervals, and may perform the notification (information) action after the elapse of a certain period of time from a point in time of the previous notification (information).

Through the above-mentioned processing, when the relay unit 3 processes, for example, the packets transmitted from the computer 93 having address C to the computer 92 having address Y, it is possible to resolve the packet output destination even when the relay unit does not give a query to the communication control unit 1. Particularly, the relay unit 3 is able to output the above-mentioned packets from the port 3003 without generating a path computation process in the communication control unit 1, thereby allowing the packets to reach the computer 92.

Meanwhile, in the above description, a description has been made of a case where data is able to be extracted from the flow macro table in step S34. In the case where the data is not able to be extracted in step S34, when the event processing part 21 performs transfer and the like of an event to the communication control unit 1 and receives control information from the communication control unit 1, the entry setting part 25 may update entries of the flow macro table in accordance with the control information.

As mentioned above, in the network system of a type in which the communication control unit 1 controls the relay unit 3 (or, relay unit group), when the relay unit 3 receives packets, there may be a case where the packet processing part 31 is not able to determine processing through the flow table within the relay unit 3. At this time, the packet processing part 31 transmits an event from the relay unit 3 to the middle box 2, disposed midway between the relay unit 3 and the communication control unit 1, a rule for creating a more coarsely-grained process than the flow unit handled by the relay unit 3 or granular entries handled by the relay unit 3 is set. When the middle box 2 receives the event, the event processing part 21 creates fine-grained entries using the contents of the flow macro table and the event information. The event processing part 21 instructs the relay unit 3 to update the flow table. For this reason, it is possible to control the flow with fine-granularity while suppressing the load of the communication control unit 1.

According to the invention, when the relay unit 3 receives the packets, the packet processing part 31 determines a processing method (for example, output port) for the flow on the basis of the flow identification information 321 of the flow table storage part 32. When the processing method is not able to be determined, the packet processing part 31 transmits information for identifying the flow to the middle box 2. When the middle box 2 receives information for identifying the flow from the relay unit 3, the event processing part 21 determines the middle box action 224 on the basis of the received information and the flow identification information 223 of the flow macro table storage part 22 or the like. The event processing part 21 instructs the relay unit 3 to update the flow table storage part 32 on the basis of the control action in order to control the flow. When the relay unit 3 detects the update instructions, the entry setting part 25 registers a processing method (for example, output port) for the flow with the flow table storage part 32 on the basis of the update instructions. For this reason, in the network system of a type in which the communication control unit 1 controls the relay unit 3 or the relay unit group, it is possible to perform the fine-grained flow control while suppressing the load of the communication control unit 1.

Next, a modified example of the first exemplary embodiment will be described. FIG. 5 is a block diagram illustrating an example of the communication flow control system according to a modified example of the first exemplary embodiment of the invention. The same components as those of the first exemplary embodiment are denoted by the same reference numerals and signs as in FIG. 1, and a description thereof will be omitted.

In the first exemplary embodiment, a case has been described in which the unit on the downstream side of the middle box 2 is the relay unit 3. In the following description, a description will be made of a case in which a plurality of middle box exists between the communication control unit 1 and the relay unit 3. The example shown in FIG. 5 shows that two middle boxes (middle boxes 2a and 2b) are connected between the communication control unit 1 and the relay unit 3. Meanwhile, in following description, a description will be made of a case of two middle boxes connected between the communication control unit 1 and the relay unit 3, but the number of middle boxes is not limited to two, or may be three or more. In the example shown in FIG. 5, a downstream communication part 24a of the middle box 2a issues control instructions to the middle box 2b, and receives an event from the middle box 2b. In addition, an upstream communication part 23b of the middle box 2b transmits an event to the middle box 2a, and receives control instructions from the middle box 2a.

Particularly, an event processing part 21b searches the flow macro table for processing corresponding to an event received from the relay unit 3. When processing corresponding to the received event is not present in the flow macro table, the event processing part 21b performs transfer and the like of an event to the middle box 2a through the upstream communication part 23b. In addition, the event processing part 21a searches the flow macro table for processing corresponding to an event received from the middle box 2b. When processing corresponding to the received event is not present in the flow macro table, the event processing part 21a performs transfer and the like of an event to the communication control part 1 through an upstream communication part 23a.

Meanwhile, flow macro table storage parts 22a and 22b and entry setting parts 25a and 25b are the same as the flow macro table storage part 22 and the entry setting part 25, respectively, in the first exemplary embodiment. In addition, the upstream communication part 23a is the same as the upstream communication part 23 in the first exemplary embodiment, and the downstream communication part 24b is the same as the downstream communication part 24 in the first exemplary embodiment. In addition, the configurations of the communication control unit 1 and the relay unit 3 are the same as those in the first exemplary embodiment, and thus a description thereof will be omitted. That is, the event processing part 21a (21b) and the entry setting part 25a (25b) are implemented by, for example, a CPU of a computer operating in accordance with a program (unit control program). For example, the program is stored in a storage part (not shown) included in the middle box 2a (2b), and the CPU may read the program, and may operate as the event processing part 21a (21b) and the entry setting part 25a (25b) in accordance with the program.

In the above-mentioned modified example according to the invention, the middle boxes 2a and 2b are connected between the communication control unit 1 and the relay unit 3. In the modified example, in addition to the first exemplary embodiment, when receiving information for identifying the flow from the unit on the downstream side (middle box 2b or relay unit 3), the event processing part 21a (21b) determines processing on the basis of the received information and information stored in the flow macro table storage part 22a (22b). The event processing part 21a (21b) performs update instructions of the flow table storage part 32 on the basis of the processing. Therefore, it is possible to adjust the load of the flow macro table or resource consumption in addition to the effect of the first exemplary embodiment.

Exemplary Embodiment 2

Figure 6:
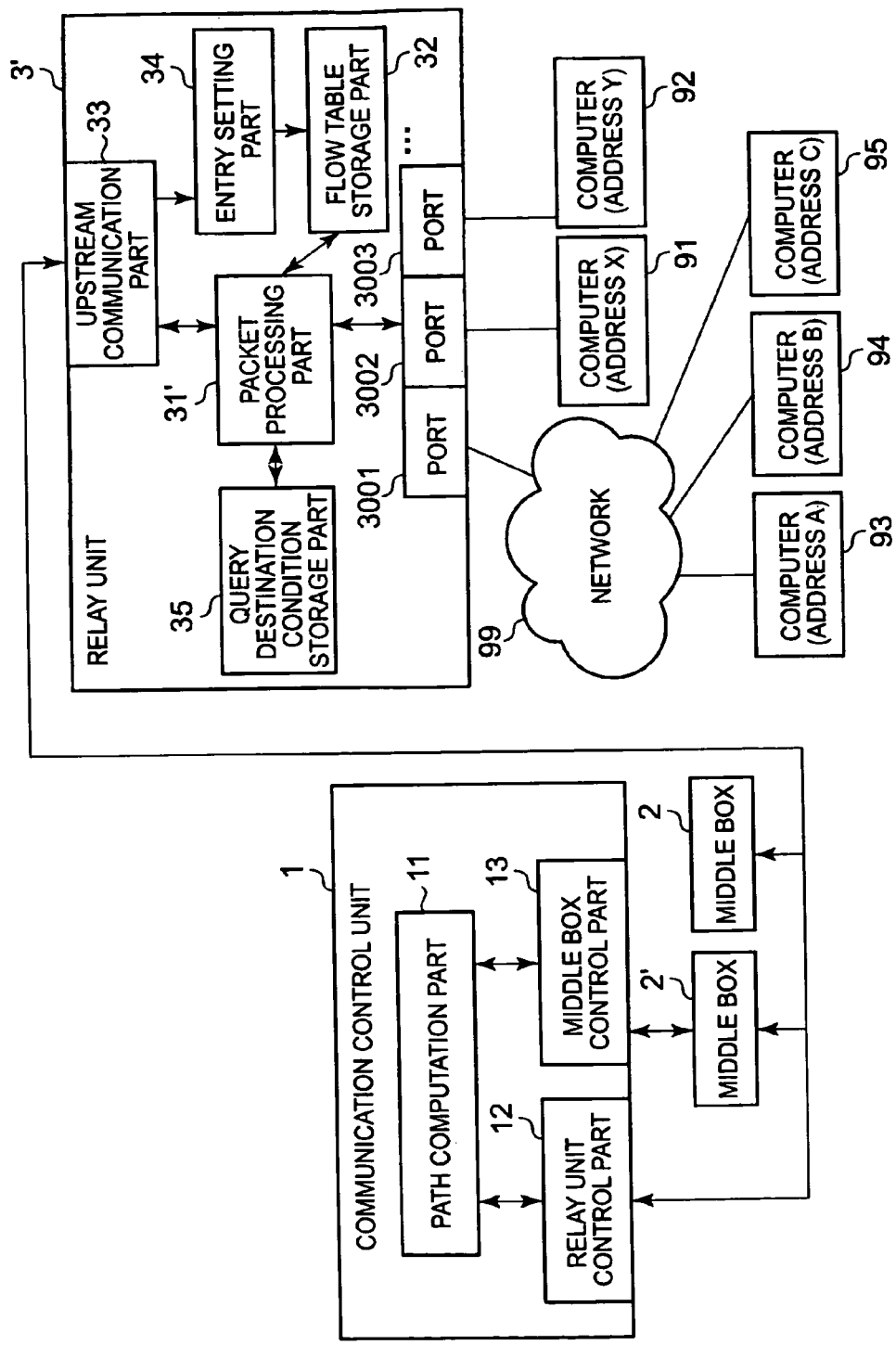
FIG. 6 is a block diagram illustrating an example of the communication flow control system according to a second exemplary embodiment.

FIG. 6 is a block diagram illustrating an example of the communication flow control system according to a second exemplary embodiment of the invention. Meanwhile, the same components as those of the first exemplary embodiment are denoted by the same reference numerals and signs as in FIG. 1, and a description thereof will be omitted. The communication flow control system according to the second exemplary embodiment includes the communication control unit 1, the middle box 2, a middle box 2', and a relay unit 3'. The relay unit 3' is connected directly to the communication control unit 1, the middle box 2 and the middle box 2'. In addition, the communication control unit 1, the middle box 2, the middle box 2', and the relay unit 3 are connected through, for example, a communication network such as a public network, but the form of the communication network is not limited to the public network. That is, in the exemplary embodiment, a description will be made of a case in which the relay unit 3' is connected to a plurality of units on the upstream side.

The relay unit 3' includes a query destination condition storage part 35 in addition to a packet processing part 31', the flow table storage part 32, the upstream communication part 33, the entry setting part 34, and the input/output ports 3001 to 3003. The query destination condition storage part 35 is a storage unit that stores a destination to which the packet processing part 31' transmits an event and conditions (hereinafter, referred to as event transmission conditions) for determining the destination in association with each other. For example, the query destination condition storage part 35 stores conditions meeting unknown packets received by the relay unit 3' and a unit on the upstream side performing a query when corresponding to the conditions in association with each other. The entries of the query destination condition storage part 35 are preset by, for example, an administrator or the like.

The packet processing part 31' searches for whether the output port corresponding to the flow contents is present in the flow table with reference to the packets received from the input/output ports 3001 to 3003. When the output port corresponding to the flow contents is not present in the flow table, the packet processing part 31' performs transfer and the like of an event to the communication control unit 1 or the middle box 2 through the upstream communication part 33. At this time, the packet processing part 31' transmits an event to a destination corresponding to transmission conditions meeting the flow out of the event transmission conditions stored in the query destination condition storage part 35.

FIG. 7 is an explanatory diagram illustrating an example of contents of the query destination condition storage part 35. In the example shown in FIG. 7, for example, when a destination of the received packets is a multicast, the packet processing part 31' determines a unit on the upstream side which is a corresponding destination to be the communication control unit 1.

The packet processing part 31' and the entry setting part 34 are implemented by, for example, a CPU of a computer operating in accordance with a program (communication flow processing program). For example, the program is stored in a storage part (not shown) included in the relay unit 3', and the CPU may read the program, and may operate as the packet processing part 31' and the entry setting part 34 in accordance with the program.

The configurations of the communication control unit 1 and the middle box 2 are the same as those in the first exemplary embodiment, and the configuration of the middle box 2' is the same as that of the middle box 2, and thus a description thereof will be omitted. Meanwhile, in the communication flow control system according to the second exemplary embodiment, although a description is made of a case in which two middle boxes 2 are included therein, the number of middle boxes 2 is not limited to two, or may be three or more.

Next, a description of an action will be provided. FIG. 8 is a flow diagram illustrating an example of processing in which the relay unit 3' queries the communication control unit 1 or the middle box 2 about a packet output destination. Processing in the case where the relay unit 3' is able to resolve the packet output port is the same as the processing (YES in steps S31 and S32, and step S37) shown in FIG. 4, and thus a description thereof will be omitted.

When the output port corresponding to the flow contents is not present in the flow table (NO in step S32), the packet processing part 31' determines the unit on the upstream side that performs event transfer and the like with reference to the query destination condition storage part 35 (step S41). The packet processing part 31' performs the event transfer and the like to the determined unit on the upstream side (communication control unit 1 or middle box 2) (step S42). The unit on the upstream side (communication control unit 1 or middle box 2) determines processing on the basis of the received event (step S43), and transmits control information for instructing the relay unit 3' to update the flow table (step S44). Hereinafter, processing until the packet processing part 31' of the relay unit 3' outputs packets from the output port is the same as the processing in steps S36 and S37 shown in FIG. 4.

According to the invention, in addition to the first exemplary embodiment, when the packet processing part 31' is not able to determine a processing method for the flow, the packet processing part transmits information for identifying the flow to the unit on the upstream side determined on the basis of information stored in the query destination condition storage part 35. Therefore, it is possible to adjust the load of the entire network system in addition to the effect of the first exemplary embodiment.

Figure 9:
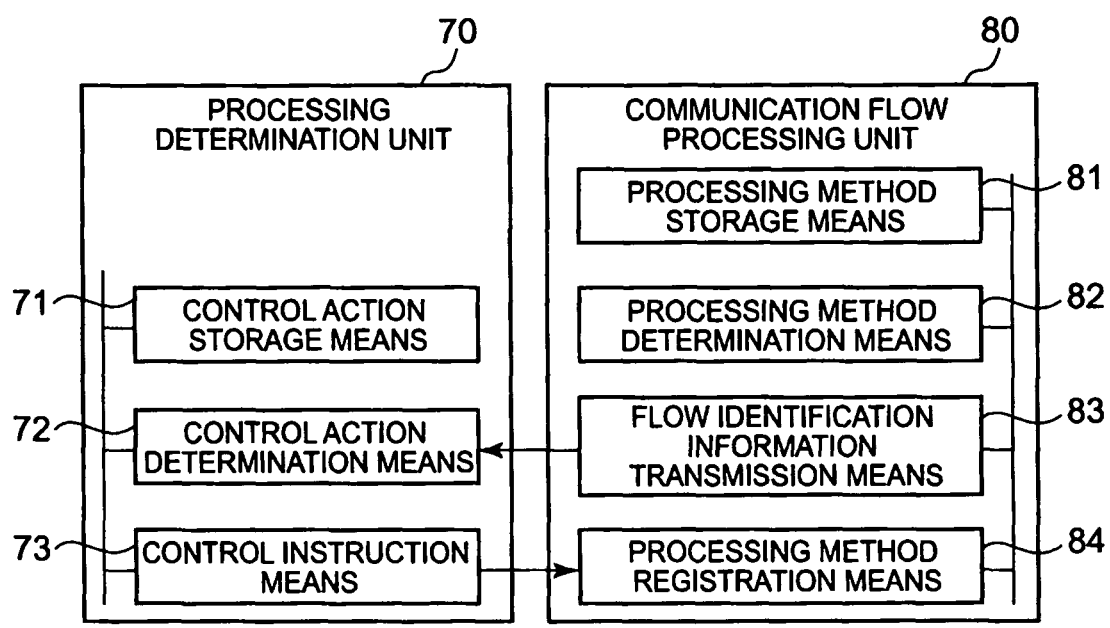
FIG. 9 is a block diagram illustrating a minimum configuration of the communication flow control system according to the invention.

FIG. 9 is a block diagram illustrating a minimum configuration of the communication flow control system according to the invention. The communication flow control system according to the invention includes a communication flow processing unit 80 (for example, relay unit 3) that processes the communication flow on the basis of the processing method determined by the communication control unit (for example, communication control unit 1) which is a unit for determining the processing method for the communication flow, and a processing determination unit 70 (for example, middle box 2), connected between the communication control unit and the communication flow processing unit 80, that determines processing for the communication flow in response to the request from the communication flow processing unit 80.

The communication flow processing unit 80 includes processing method storage means 81 (for example, flow table storage part 32) that stores first flow identification information (for example, flow identification information 321) which is information for identifying the communication flow and a processing method (for example, output port 322) in association with each other, a processing method determination means 82 (for example, packet processing part 31) that determine the processing method on the basis of the first flow identification information stored in the processing method storage means 81 when packets are received, a flow identification information transmission means 83 (for example, packet processing part 31) that transmits information (for example, event) within the packets equivalent to a portion or all of the first flow identification information for identifying the communication flow to the processing determination unit 70 when the processing method determination means 82 is not able to determine the processing method for the communication flow of the packets, and a processing method registration means 84 (for example, entry setting part 25) that registers the processing method for the communication flow (for example, the packets of destination address Y are output from the port 3003 on the basis of source address C) with the process method storage means 81 on the basis of control instructions when the control instructions for the communication flow (for example, update instructions of the flow table storage part 32) are detected from the processing determination unit 70.

The processing determination unit 70 includes a control action storage means 71 (for example, flow macro table storage part 22) that stores second flow identification information (for example, relay unit identifier 221, event type 222, and flow identification information 223) which is a portion or all of the first flow identification information and a control action (for example, middle box action 224) which is an action performed by the processing determination unit 70 in association with each other, a control action determination means 72 (for example, event processing part 21) that determines the control action, at the time of receiving information within the packets equivalent to a portion or all of the first flow identification information from the communication flow processing unit 80, on the basis of the received information and the second flow identification information stored in the control action storage means 71, and a control instruction means 73 (for example, event processing part 21) that instructs (for example, update instructions of the flow table storage part 32) the communication flow processing unit 80 to control the communication flow on the basis of the control action determined by the control action determination means 72.

With such a configuration, it is possible to perform a fine-grained flow control while suppressing the load of the communication control unit in the network system of a type in which the communication control unit controls the relay unit or the relay unit group.

Moreover, in the above-mentioned exemplary embodiment, a configuration is disclosed in which two or more processing determination units 70 (for example, middle boxes 2a and 2b) are connected between the communication control unit and the communication flow processing unit 80, the control action determination means 72 of each of the processing determination units 80 determines the control action, at the time of receiving information within the packets equivalent to a portion or all of the first flow identification information from another processing determination unit 70 or communication flow processing unit 80 (for example, unit on the downstream side), on the basis of the received information and the second flow identification information stored in the control action storage means 71, and the control instruction means 73 of the processing determination units 80 instructs another processing determination unit 70 or communication flow processing unit 80, from which information within the packets equivalent to a portion or all of the first flow identification information is received, to control the communication flow on the basis of the control action determined by the control action determination means 72.

Moreover, in the above-mentioned exemplary embodiment, a configuration is disclosed in which the communication flow processing unit 80 includes transmission condition storage means (for example, query destination condition storage part 35) that stores a destination for transmitting information within the packets equivalent to a portion or all of the first flow identification information and transmission conditions (for example, event transmission conditions) which are conditions for determining the destination in association with each other, and when the processing method determination means 82 is not able to determine the processing method for the communication flow of the packets, the flow identification information transmission means 83 (for example, packet processing part 31') transmits information within the packets equivalent to a portion or all of the first flow identification information to a destination (for example, unit on the upstream side) corresponding to transmission conditions meeting the communication flow out of the transmission conditions stored in the transmission condition storage means. In this way, it is possible to adjust the load of the entire network system.

Moreover, in the above-mentioned exemplary embodiment, a configuration is disclosed in which the processing determination unit 70 include processing method request means (for example, event processing part 21) that transmits a request for determination of the processing method for the communication flow to the communication control unit (for example, communication control unit 1) when the control action determination means 72 is not able to determine the control action, and control action registration means (for example, entry setting part 25) that registers the control action based on the processing method with the control action storage means 71 when the processing method is received from the communication control unit.

Moreover, in the above-mentioned exemplary embodiment, a configuration is disclosed in which the processing determination unit 70 includes notification means (for example, event processing part 21) that notifies the communication control unit of the control action determined by the control action determination means 72. In this way, the communication control unit is able to ascertain processing for the flow on the network.

As described above, although the present invention has been described with reference to the exemplary embodiments and the examples, the present invention is not limited to the exemplary embodiments and the examples mentioned above. It will be appreciated by those skilled in the art that various changes and modifications can be made to the configuration or details of the present invention within the scope of the present invention.

This application claims priority based on Japanese Patent Application No. 2009-81938 filed in Japanese Patent Office on Mar. 30, 2009, the contents of which are incorporated herein by reference.

INDUSTRIAL APPLICABILITY

The present invention is suitably applied to a communication flow control system capable of suppressing the load of a flow control performed by a communication control unit in a network system in which the communication control unit controls a communication flow.

REFERENCE SIGNS LIST

1 communication control unit
2, 2a, 2b, 2' middle box
3, 3' relay unit
11 path computation part
12 relay unit control part
13 middle box control part
21, 21a, 21b event processing part
22, 22a, 22b flow macro table storage part
23, 23a, 23b upstream communication part
24, 24a, 24b downstream communication part
25, 25a, 25b entry setting part
31, 31' packet processing part
32 flow table storage part
33 upstream communication part
34 entry setting part
35 query destination condition storage part
91 to 95 computer
99 network
3001 to 3003 input/output port

The invention claimed is:
1. A communication flow control system comprising:
a communication flow processing device that comprises a hardware that includes one or more first processors, the communication flow processing device processing a communication flow based on a processing method determined by a communication control device that determines the processing method for the communication flow; and
a processing determination device, connected between the communication control device and the communication flow processing device that determines processing for the communication flow in response to a request from the communication flow processing device,
wherein the communication flow processing device includes:
a first memory storing instructions; and
the one or more first processors configured to execute the instructions to:
store first flow identification information in a first table for identifying the communication flow and the processing method in association with each other, the first table being configured by a controller having a hierarchically higher level than the one or more first processors, wherein the first table stores a first entry to be used for determining processing of a packet flow, determine the processing method on the basis of the first flow identification information stored, when packets are received, transmit information within the packets equivalent to a portion or all of the first flow identification information for identifying the communication flow to the processing determination device, when not able to determine the processing method for the communication flow of the packets, register the processing method for the communication flow based on control instructions, when the control instructions for the communication flow are detected from the processing determination device, and wherein the processing determination device includes:

a second memory storing instructions; and one or more second processors configured to execute the instructions to:

store second flow identification information in a second table which is a portion or all of the first flow identification information and a control action which is an action performed by the processing determination device in association with each other, receive information within the packets corresponding to a portion or all of the first flow identification information from the communication flow processing device, determine the control action based on the received information and the stored second flow identification information, and instruct the communication flow processing device to control the communication flow based on the determined control action, wherein the one or more second processors configure, based on the first table, a second table which stores a second entry to be used for controlling a switching element for forwarding a packet included in the packet flow, and wherein the one or more second processors modify the first entry into the second entry such that the first entry of the first table and the second entry of the second table identify a different range of a packet flow from each other.

2. The communication flow control system according to claim 1, wherein two or more processing determination devices are connected between the communication control device and the communication flow processing device, wherein each of the processing determination devices determines the control action, at the time of receiving information within the packets equivalent to a portion or all of the first flow identification information from another processing determination device or communication flow processing device, based on the received information and the stored second flow identification information, wherein each of the processing determination devices instructs another processing determination device or communication flow processing device, from which information within the packets equivalent to a portion or all of the first flow identification information is received, to control the communication flow, based on the determined control action, and wherein the one or more second processors are further configured to execute the instructions to configure the first table so that the first entry identifies a broader range of the packet flow than the second entry.

3. The communication flow control system according to claim 1, wherein the one or more first processors are further configured to execute the instructions to store a destination for transmitting information within the packets equivalent to a portion or all of the first flow identification information and transmission conditions for determining the destination in association with each other, and when not able to determine the processing method for the communication flow of the packets, transmit information within the packets equivalent to a portion or all of the first flow identification information to a destination corresponding to transmission conditions.

4. The communication flow control system according to claim 1, wherein the one or more second processors are further configured to execute the instructions to:

transmit a request for determination of the processing method for the communication flow, when not able to determine the control action, and register the control action based on the processing method, when the processing method is received.

5. The communication flow control system according to claim 1, wherein the one or more second processors are further configured to execute the instructions to notify the communication control device of the determined control action.

6. A communication flow processing device including one or more hardware processors, that determine a processing method for a communication flow from information within packets equivalent to a portion or all of flow identification information for identifying the communication flow, in response to a request to perform a control, the communication flow processing device comprising:

a memory storing instructions; and the one or more processors configured to execute the instructions to:

store the flow identification information and the processing method in association with each other, including a table which stores a first table configured by a controller having a hierarchically higher level than the one or more processors, wherein the first table stores a first entry to be used for determining processing of a packet flow;

determine the processing method based on the stored flow identification information, when packets are received;

transmit information within the packets equivalent to a portion or all of the flow identification information for identifying the communication flow, when not able to determine the processing method for the communication flow of the packets, and register the processing method for the communication flow based on control instructions, when the control instructions for the communication flow are detected, wherein the one or more processors configure, based on the first table, a second table which stores a second entry to be used for controlling a switching element for forwarding a packet included in the packet flow, and wherein the one or more processors modify the first entry into the second entry so that the first entry of the first table and the second entry of the second table identify a different range of a packet flow from each other.

7. The communication flow processing device according to claim 6, wherein the one or more processors are further configured to execute the instructions to:

store a destination for transmitting information within the packets equivalent to a portion or all of the flow identification information, store transmission conditions for determining the destination in association with each other, and when not able to determine the processing method for the communication flow of the packets, transmit information within the packets equivalent to a portion or all of first flow identification information to a destination corresponding to transmission conditions, wherein the one or more processors configure the first table so that the first entry identifies a broader range of the packet flow than the second entry.

8. A processing determination device that stores first flow identification information for identifying a communication flow and a processing method for the communication flow in association with each other, including one or more hardware processors that determine the processing method for the communication flow based on stored first flow identification information, when packets are received, and determine processing for the communication flow in response to a request, the processing determination device comprising:

a memory storing instructions; and the one or more processors configured to execute the instructions to:

store second flow identification information, which is a portion or all of the first flow identification information and a control action in association with each other, the control action including a table which stores a first table configured by a controller having a hierarchically higher level than the one or more processors, wherein the first table stores a first entry to be used for determining processing of a packet flow;

receive information within the packets corresponding to a portion or all of the first flow identification information, determine the control action based on the received information and the stored second flow identification information, and control the communication flow on the basis of the determined control action, wherein the one or more processors configure, based on the first table, a second table which stores a second entry to be used for controlling a switching element for forwarding a packet included in the packet flow, and wherein the one or more processors modify the first entry into the second entry so that the first entry of the first table and the second entry of the second table identify a different range of a packet flow from each other.

9. The processing determination device, according to claim 8, wherein the one or more processors are further configured to execute the instructions to:

determine the control action, at the time of receiving information within the packets equivalent to a portion or all of the first flow identification information, based on received information and the stored second flow identification information; and control the communication flow, based on the determined control action, wherein the one or more processors configure the first table so that the first entry identifies broader range of the packet flow than the second entry.

10. A method for controlling a communication flow, comprising:

processing a communication flow based on a determined processing method determining the processing method based on stored flow identification information including a first table comprising a first flow identification information which comprises information for identifying the communication flow and the processing method in association with each other, when packets are received; configuring the first table to be used for controlling a controller having a hierarchically lower level than the communication flow processing, wherein the first table stores a first entry to be used for determining processing of a packet flow;

transmitting information within the packets equivalent to a portion or all of the first flow identification information for identifying the communication flow to determine processing for the communication flow in response to a request, when the processing method for the communication flow of the packets is not able to be determined;

determining a control action, at the time of receiving information within the packets equivalent to a portion or all of the first flow identification information, based on a second table comprising a stored second flow identification information that stores the received information;

configuring, based on the first table, the second table which stores a second entry to be used for controlling a switching element for forwarding a packet included in the packet flow, configuring the second flow identification information, which is a portion or all of the first flow identification information, and the control action in association with each other;

controlling the communication flow on the basis of the control action;

registering the processing method for the communication flow based on the control instructions, when the control instructions for the communication flow are detected; and modifying the first entry into the second entry such that the first entry of the first table and the second entry of the second table identify a different range of a packet flow from each other.

11. The method of controlling a communication flow according to claim 10, further comprising:

receiving information within the packets corresponding to a portion or all of the first flow identification information;

determining the control action based on the received information and the stored second flow identification information;

controlling the communication flow, based on control action; and configuring the first table so that the first entry identifies a broader range of the packet flow than the second entry.

12. A method of processing a communication flow, comprising:

determining a processing method based on stored flow identification information, wherein the flow identification information is stored in a first table for identifying a communication flow and the processing method of the communication flow in association with each other, when packets are received, the first table being configured by a controller having a hierarchically higher level than a second controller, wherein the first table stores a first entry to be used for determining processing of a packet flow;

transmitting information within the packets equivalent to a portion or all of the flow identification information for identifying the communication flow to a processing determination device that determines the processing method from information within the packets equivalent to a portion or all of the flow identification information in response to a request;

instructing the processing determination device to perform a control, when the processing method for the communication flow of the packets is not able to be determined;

registering the processing method for the communication flow based on control instructions, when the control instructions for the communication flow are detected;

configuring, based on the first table, a second table which stores a second entry to be used for controlling a switching element for forwarding a packet included in the packet flow; and modifying the first entry into the second entry so that the first entry of the first table and the second entry of the second table identify a different range of a packet flow from each other.

13. The method of processing a communication flow according to claim 12, further comprising:

transmitting information within the packets equivalent to a portion or all of first flow identification information, to a destination corresponding to transmission conditions for the communication flow, when the processing method for the communication flow of the packets is not able to be determined; and configuring the first table so that the first entry identifies a broader range of the packet flow than the second entry.

14. A processing determination method comprising:

determining a control action when receiving information within packets equivalent to a portion or all of first flow identification information from a communication flow processing device, the communication flow processing device which storing a first table comprising the first flow identification information for identifying a communication flow and a processing method for the communication flow in association with each other, the first table being configured by a controller having a hierarchically higher level than a second controller, wherein the first table stores a first entry to be used for determining processing of a packet flow, determining the processing method for the communication flow based on the stored first flow identification information when the packets are received, and based on the received information and on a second table comprising a stored second flow identification information that stores the control action, the control action determining processing for the communication flow in response to a request;

instructing the communication flow processing device to control the communication flow based on control action;

configuring, based on the first table, the second table which stores a second entry to be used for controlling a switching element for forwarding a packet included in the packet flow; and modifying the first entry into the second entry so that the first entry of the first table and the second entry of the second table identify a different range of a packet flow from each other.

15. The processing determination method according to claim 14, further comprising:

determining the control action, instructing control of the communication flow based on the control action, and configuring the first table so that the first entry identifies a broader range of the packet flow than the second entry.

16. A non-transitory computer readable medium storing a program that, when executed by a processor of a computer that stores flow identification information for identifying a communication flow and a processing method for the communication flow in association with each other, the program causing the computer to execute a method comprising:

determining the processing method based on the stored flow identification information, when packets are received;

transmitting information within the packets equivalent to a portion or all of the flow identification information for identifying the communication flow to a processing determination device that determines the processing method for the communication flow from information within the packets equivalent to a portion or all of the flow identification information in response to a request and that instructs the processing determination device to perform a control, when the processing method for the communication flow of the packets is not able to be determined;

registering the processing method for the communication flow based on the control instructions, when the control instructions for the communication flow are detected from the processing determination device;

storing a first table configured by a hierarchically-higher-level controller, the first table stores a first entry to be used for determining processing of a packet flow;

configuring, based on the first table, a second table which stores a second entry to be used for controlling a switching element for forwarding a packet included in the packet flow; and modifying the first entry into the second entry so that the first entry of the first table and the second entry of the second table identify a different range of a packet flow from each other.

17. The non-transitory computer-readable medium according to claim 16, the method further comprising:

transmitting information within the packets equivalent to a portion or all of first flow identification information to the destination corresponding to transmission conditions, when the processing method for the communication flow of the packets is not able to be determined; and configuring the first table so that the first entry identifies a broader range of the packet flow than the second entry.

* * * * *